(12) United States Patent
Silva et al.

(10) Patent No.: US 9,963,236 B2
(45) Date of Patent: May 8, 2018

(54) MODULAR SYSTEM FOR DISTRIBUTING ELECTRICAL POWER AND DATA BETWEEN STRUCTURES

(71) Applicant: The Boeing Company, Chicago, IL (US)

(72) Inventors: James E. Silva, Seattle, WA (US); Andrew John Tofflemire, Shoreline, WA (US); Michael A. Johnson, Kirkland, WA (US); Samuel J. Elliott, Everett, WA (US); David E. Lee, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 166 days.

(21) Appl. No.: 15/019,485

(22) Filed: Feb. 9, 2016

(65) Prior Publication Data

US 2017/0225789 A1    Aug. 10, 2017

(51) Int. Cl.
*B60L 11/02* (2006.01)
*B60L 11/18* (2006.01)
*B64D 11/06* (2006.01)

(52) U.S. Cl.
CPC .......... *B64D 11/0624* (2014.12); *B60L 11/02* (2013.01); *B60L 11/18* (2013.01)

(58) Field of Classification Search
CPC .......... B60L 11/00; B60L 11/02; B60L 11/14; B60L 11/18; B60R 16/00; B60R 16/03; B60R 16/0315; B64D 11/00; B64D 11/0624; Y02T 10/00; Y02T 10/7005; Y02T 10/7077

USPC ......................................................... 307/9.1
See application file for complete search history.

(56) References Cited

U.S. PATENT DOCUMENTS

| 5,671,833 | A | * | 9/1997 | Edwards | H02G 11/02 |
| | | | | | 191/12.2 R |
| 6,125,582 | A | * | 10/2000 | Mondragon | E05D 13/1261 |
| | | | | | 160/200 |
| 6,267,430 | B1 | | 7/2001 | Cresseaux | |
| 8,342,855 | B2 | | 1/2013 | Tsirangelos et al. | |
| 2005/0268319 | A1 | | 12/2005 | Brady, Jr. | |
| 2006/0049311 | A1 | * | 3/2006 | Callahan | B60R 16/0207 |
| | | | | | 244/118.6 |
| 2014/0138116 | A1 | * | 5/2014 | Burke | H02G 11/02 |
| | | | | | 174/69 |

(Continued)

FOREIGN PATENT DOCUMENTS

WO    00/22488    4/2000

*Primary Examiner* — Lincoln Donovan
*Assistant Examiner* — David Mattison
(74) *Attorney, Agent, or Firm* — Thompson Hine LLP

(57) ABSTRACT

A system for electrically coupling a first structure with a second structure in a vehicle is disclosed, and includes a control module receiving at least one of electrical power and data, a cable, and a reel. The cable has a variable length and is electrically coupled to the control module. The cable transmits at least one of electrical power and data from the first structure to the second structure. The reel is located at the first structure and defines an axis of rotation. The cable is windable around the reel, and the reel is rotatable about the axis of rotation to adjust the variable length of the cable. The variable length of the cable is a portion of the cable that extends between the first structure to the second structure that is not wound around the reel.

20 Claims, 5 Drawing Sheets

(56) References Cited

U.S. PATENT DOCUMENTS

2014/0261766 A1 9/2014 Tracey et al.

* cited by examiner

MODULAR SYSTEM FOR DISTRIBUTING ELECTRICAL POWER AND DATA BETWEEN STRUCTURES

FIELD

The disclosed system and method relate to an electrical distribution system and, more particularly, to an electrical distribution system having a variable length portion of a cable that electrically couples a first structure to a second structure.

BACKGROUND

Passenger seats in an aircraft may be equipped with various electronic devices that require power, data, or both. Power and data may be delivered to the electronic devices within a passenger cabin of the aircraft by cables and wiring. The aircraft may be equipped with raceways that include one or more elongated channels. The cables may be retained within the elongated channels of the raceways. The raceways also include multiple raceway outlets or notches where the cable may exit the raceway and mate to a connector or connect directly to a power and data module associated with a passenger seat. Thus, because the positions where the cable exits the raceway are fixed, it should be appreciated that the position of the passenger seats on the aircraft depends on the position of power and data notches cut out of the raceway. Therefore, if the positioning between the passenger seats is changed, it may be necessary to provide new or modified raceways and reroute passenger seat cables.

In addition to the above mentioned challenges encountered with the positioning of the passenger seats, the existing raceways also introduce several other issues as well. For example, it may be tedious and time consuming to install the raceways and cables within the aircraft. Moreover, there usually are many parts that need to be measured and cut when installing the raceways and the cables. Furthermore, it should also be appreciated that there are many ergonomic challenges when installing the raceways. Indeed, a mechanic may need to contort his or her body into various positions for extended periods of time in order to successfully install the raceways and cables. Finally, it should be appreciated that sometimes the raceway covers may result in an uneven surface, which creates aesthetic issues for airline customers. Thus, there exists a continuing need in the art to improve the current approach for routing cables and wiring in an aircraft.

SUMMARY

In one example, a system for electrically coupling a first structure with a second structure in a vehicle is disclosed, and includes a control module receiving at least one of electrical power and data, a cable, and a reel. The cable has a variable length and is electrically coupled to the control module. The cable transmits at least one of electrical power and data from the first structure to the second structure. The reel is located at the first structure and defines an axis of rotation. The cable is windable around the reel, and the reel is rotatable about the axis of rotation to adjust the variable length of the cable. The variable length of the cable is a portion of the cable that extends between the first structure to the second structure that is not wound around the reel.

In another example, a system for electrically coupling a first row of passenger seats with a second row of passenger seats in an aircraft is disclosed, and includes a control module receiving at least one of electrical power and data, a cable, and a reel. The cable has a variable length and is electrically coupled to the control module. The cable transmits at least one of electrical power and data from the first row of passenger seats to the second row of passenger seats. The reel is located at the first row of passenger seats and defines an axis of rotation. The cable is windable around the reel, and the reel is rotatable about the axis of rotation to adjust the variable length of the cable. The variable length of the cable is a portion of the cable that extends between the first row of passenger seats to the second row of passenger seats that is not wound around the reel.

In yet another example, a method of electrically coupling a first row of passenger seats with a second row of passenger seats in an aircraft is disclosed. The method includes electrically coupling a cable to a control module. The cable has a variable length and the control module receives at least one of electrical power and data. The cable transmits at least one of electrical power and data from the first row of passenger seats to the second row of passenger seats. The method further includes winding the cable around a reel. The reel is located at the first row of passenger seats and defines an axis of rotation. The method also includes rotating the reel about the axis of rotation to adjust the variable length of the cable. The variable length of the cable is a portion of the cable that extends between the first row of passenger seats to the second row of passenger seats that is not wound around the reel.

Other objects and advantages of the disclosed method and system will be apparent from the following description, the accompanying drawings and the appended claims.

DETAILED DESCRIPTION

Figure 1:
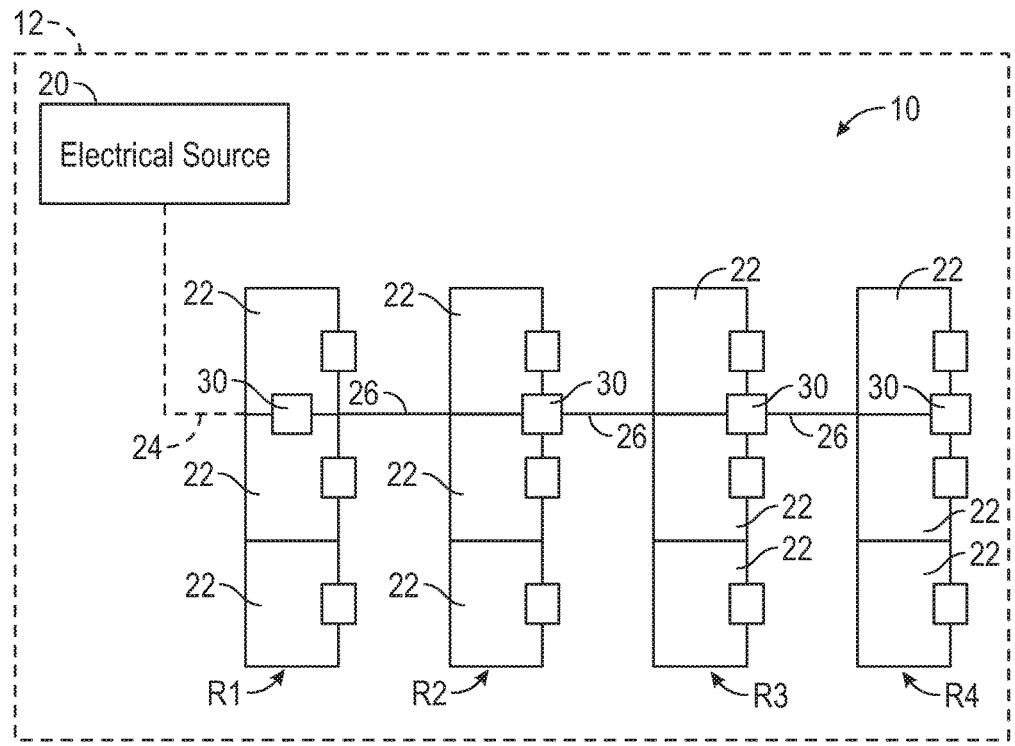
FIG. 1 is an exemplary illustration of the disclosed adjustable distribution system for delivering electrical power, data, or both from an electrical source through a primary cable to a plurality of passenger seats via a secondary cable.

FIG. 1 is an exemplary schematic diagram of the disclosed adjustable electrical distribution system 10 for delivering electrical power, data, or both power and data from an electrical source 20 within a vehicle 12 to a plurality of passenger seats 22. The passenger seats 22 may include various devices that require electrical power and data for operation such as, for example, in-flight entertainment systems and in-seat power ports. The electrical distribution system 10 may include the electrical source 20, a main cable 24, a plurality of secondary cables 26, and a plurality of reels 30 (seen in FIG. 2). The electrical source 20 may be the main source of electrical power, data, or both within the vehicle 12. For example, the electrical source 20 may be an auxiliary power unit (APU), a bleed air generator, a battery, or a ram air turbine. The main cable 24 electrically couples the electrical source 20 to a first row R1 of passenger seats 22. As explained in greater detail below, the secondary cables 26 may be used to electrically couple one of the rows R1-R4 of passenger seats 22 with another row of passenger seats 22. It is to be appreciated that the secondary cables 26 may transmit electrical power, data, or both power and data.

In one exemplary embodiment, the vehicle 12 may be an aircraft. However, it is to be appreciated that the disclosure is not limited to an aircraft and other types of vehicles may be used as well such as, for example, automobiles, buses, ferries, and trains. Furthermore, although FIG. 1 illustrates passenger seats, it is to be appreciated that the disclosure is not limited to just passenger seating. Indeed, the electrical distribution system 10 may be used to deliver electrical power and data to any type of structure such as, for example, a galley, crew rest, lavatory, or closet.

Figure 2:
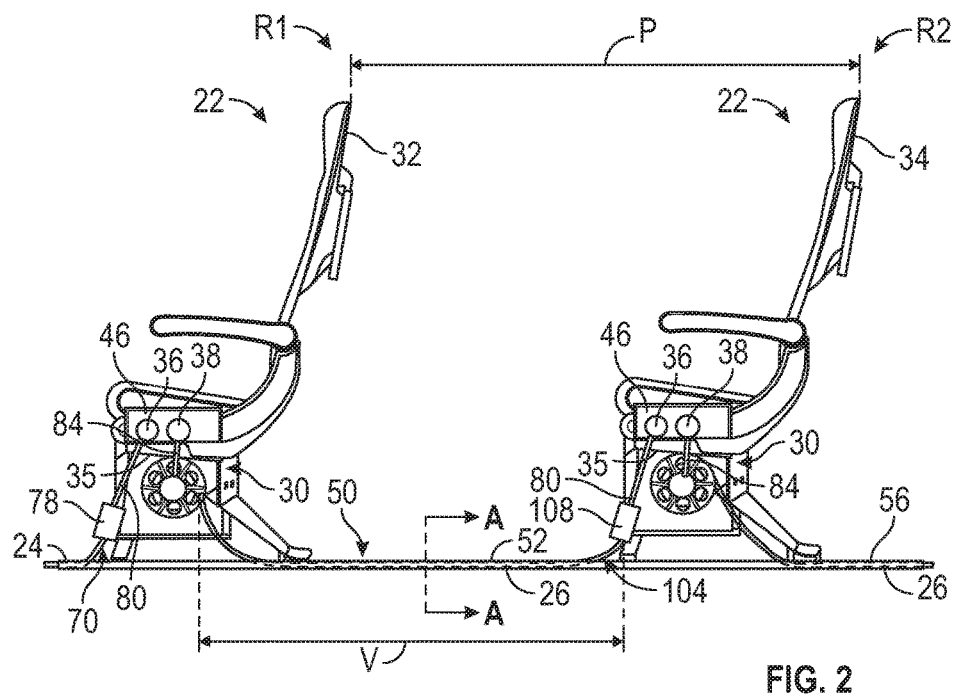
FIG. 2 is an illustration of two rows of passenger seats shown in FIG. 1, where a reel is located underneath each row of seats.

FIG. 2 is an illustration of a single passenger seat 22 in row R1 and a single passenger seat 22 in row R2, where the passenger seat 22 in row R1 is located directly in front of the passenger seat 22 in row R2. As seen in FIG. 2, a pitch distance P may be measured between a rear surface 32 of the passenger seat 22 in row R1 and a rear surface 34 of the passenger seat 22 in row R2. However, it should be appreciated that the pitch distance P may represent the distance from any point on the passenger seat 22 in row R1 to the exact same point on the passenger seat 22 in row R2. Although only the passenger seats 22 in rows R1 and R2 are illustrated in FIG. 2, it is to be appreciated that the remaining rows of passenger seats 22 within the vehicle 12 may also include a reel 30 as well.

In the non-limiting embodiment as shown in FIG. 2, the reels 30 may each be located underneath one of the passenger seats 22 in each row. The reel 30 may be placed within a housing or shroud (not illustrated). Specifically, in one embodiment the reel 30 may be placed within an existing shroud currently used to house the secondary cables in existing systems that are currently available. Although FIG. 2 illustrates the reels 30 positioned substantially perpendicular with respect to a bottom surface 35 of a respective passenger seat 22, it is to be appreciated that in an alternative embodiment the reels 30 may be positioned substantially parallel with respect to the bottom surface 35 of a respective passenger seat 22 as well. Specifically, the reels 30 may be placed along the bottom surface 35 of a respective passenger seat 22.

Figure 4:
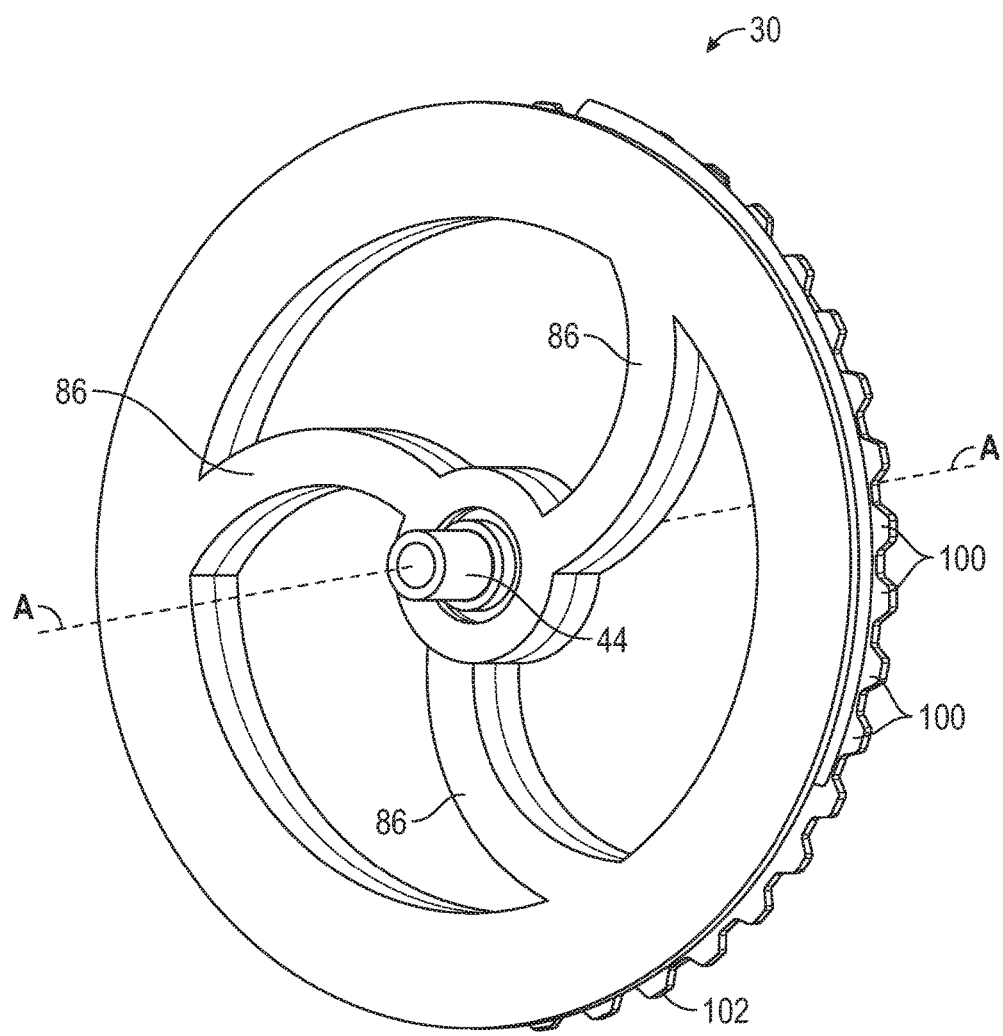
FIG. 4 is a perspective view of another embodiment of a reel.
Figure 5:
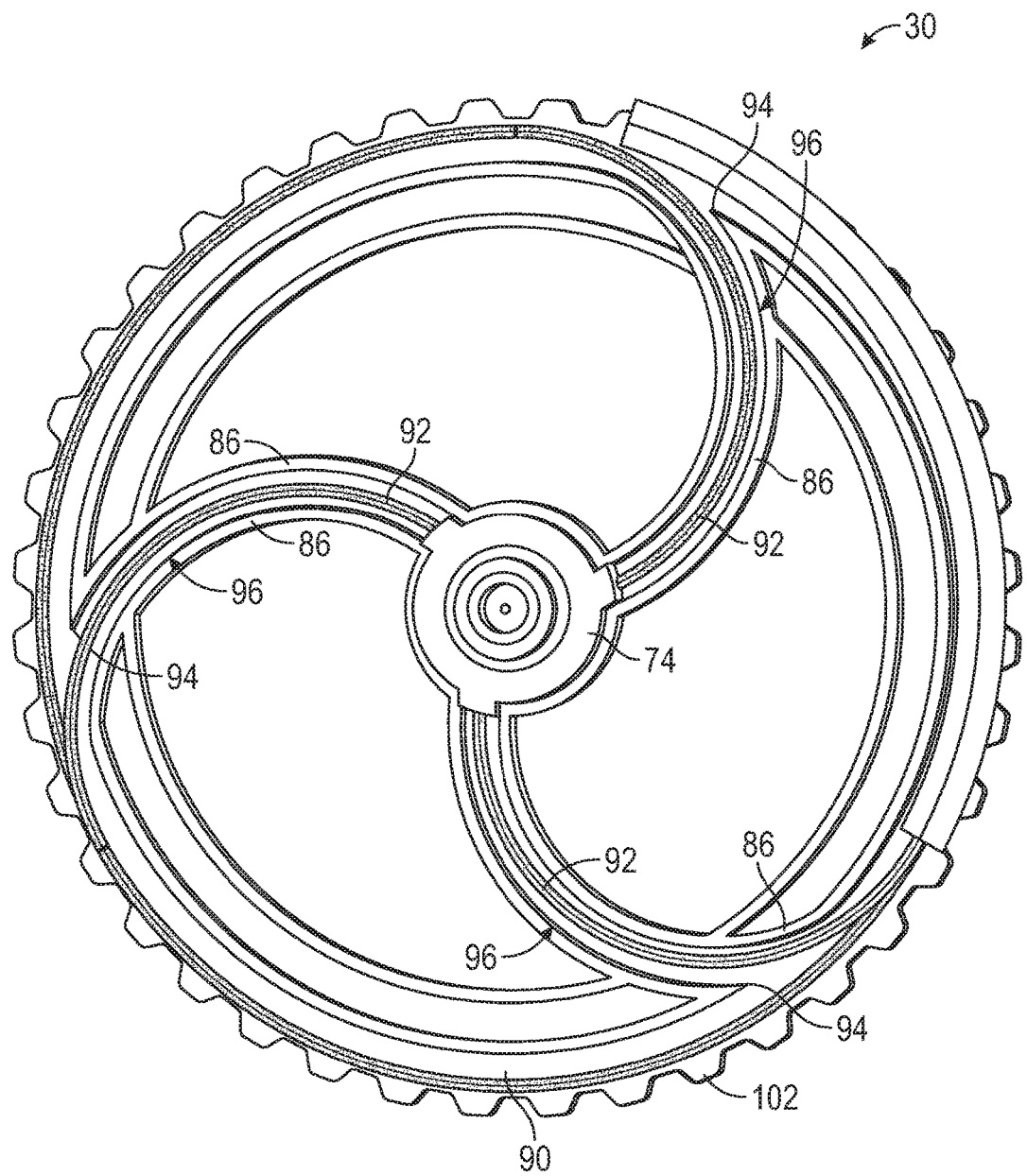
FIG. 5 is a front view of the reel shown in FIG. 4, where a cover has been removed.
Figure 6:
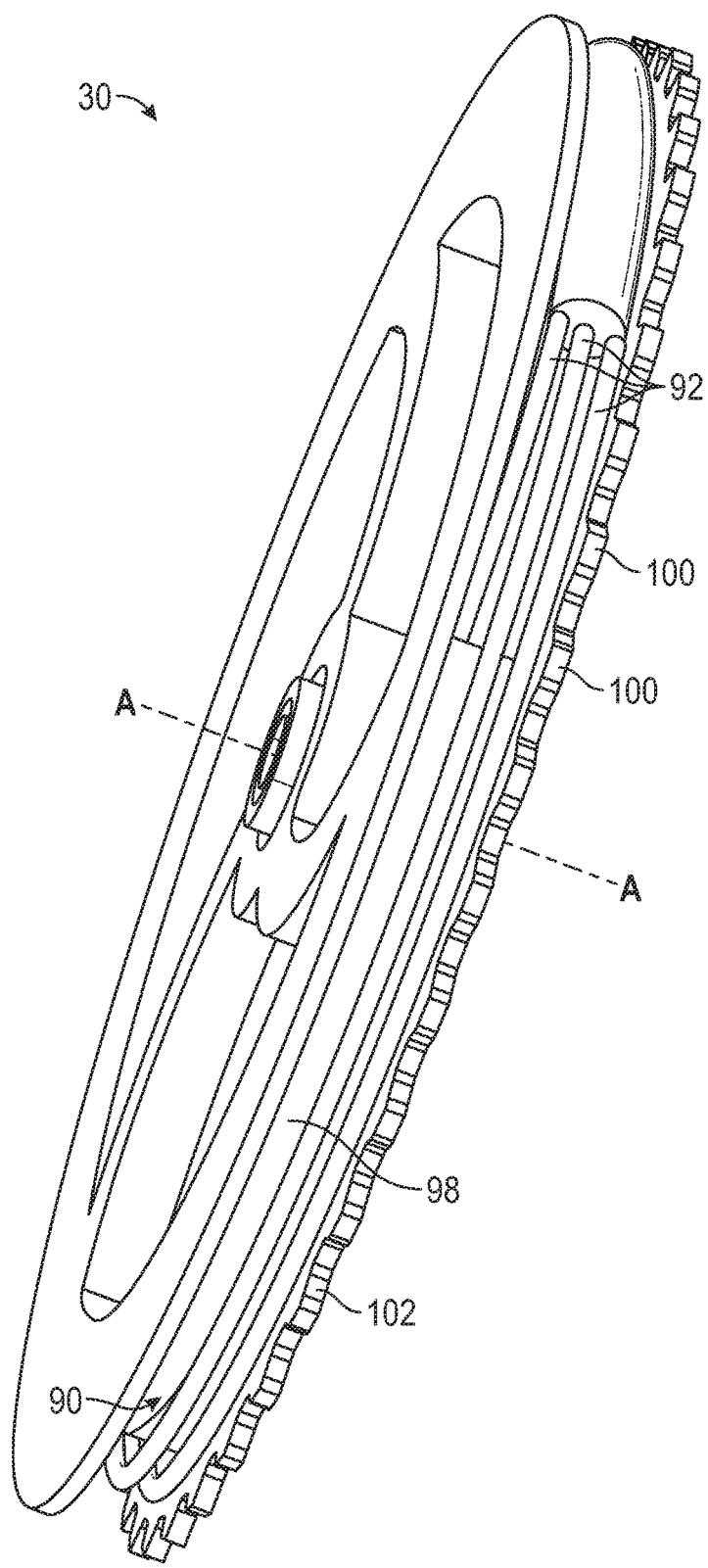
FIG. 6 is a side perspective view of the reel shown in FIG. 4.

As shown in FIGS. 5-6 and explained in greater detail below, each secondary cable 26 may be windable around a corresponding reel 30. For example, the secondary cable 26 shown in FIG. 2 is windable around the reel 30 located underneath the passenger seat 22 in row R1. The reel 30 may be any type of frame rotatable about an axis which is used for winding and storing the secondary cable 26. Referring to FIGS. 2 and 4, each reel 30 may be rotated about an axis of rotation A-A (FIG. 4) in both a clockwise and a counterclockwise direction. Rotation of the reel 30 adjusts a variable length V of secondary cable 26 located between two rows of passenger seats 22. For example, in the embodiment as shown in FIG. 2, rotation of the reel 30 located underneath row R1 adjusts the variable length V of the secondary cable 26 located between the passenger seat 22 in row R1 and the passenger seat 22 in row R2. The variable length V of the secondary cable 26 may represent the length of a single secondary cable 26 that extends between the two passenger seats 22, which is not wound around its corresponding reel 30. In the non-limiting embodiment as shown in FIG. 2, the reel 30 may be rotated in the counterclockwise direction to decrease the variable length V of the secondary cable 26 and rotated in the clockwise direction to increase the variable length V of the secondary cable 26.

Each secondary cable 26 may be used to electrically couple one of the rows of passenger seats 22 to another row of passenger seats 22. The secondary cables 26 may each include a fixed length that exceeds the pitch distance P between the passenger seats 22. The fixed length represents the overall length or actual physical length of the secondary cable 26. In one non-limiting embodiment, the fixed length may range from about 30 inches (76.2 centimeters) to about 32 inches (81.28 centimeters). As seen in FIG. 2, the secondary cable 26 extends from the reel 30 and is routed towards the passenger seat 22 located directly behind. As explained in greater detail below and illustrated in FIG. 3, in one non-limiting embodiment a portion 50 (FIG. 2) of the secondary cable 26 may be hidden from view by routing the portion of the secondary cable 26 along a seat track cover 52 located along a seat track 60 of the vehicle 12.

Figure 3:
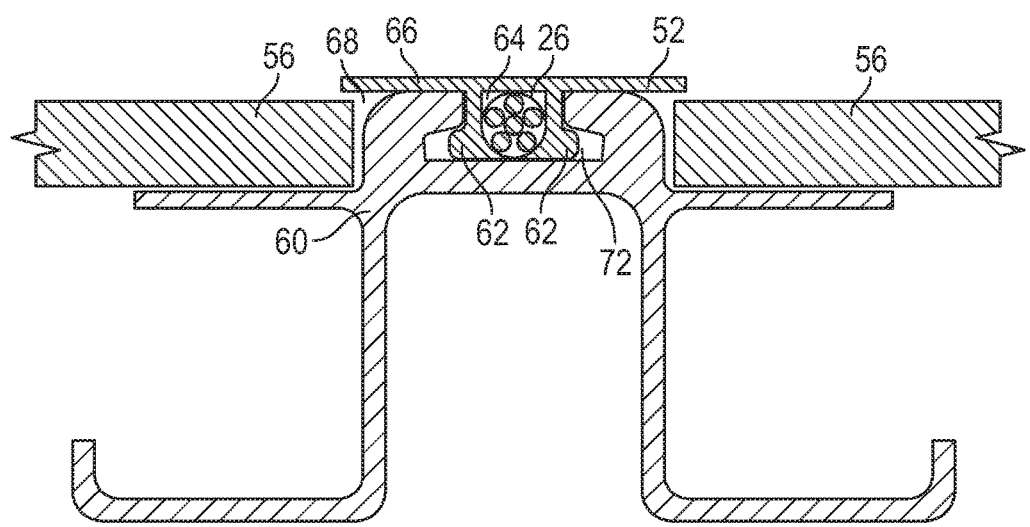
FIG. 3 is a cross-sectioned view of a secondary cable, a seat track cover, floor boards, and a seat track taken along section line A-A in FIG. 2.

FIG. 3 is a cross-sectioned view of the secondary cable 26, the seat track cover 52, the floor board 56, and the seat track 60 taken along section line A-A in FIG. 2. The seat track cover 52 may define two retention legs 62 that define a channel 64. The seat track cover 52 may also define a cover portion 66. The cover portion 66 of the seat track cover 52 may be used to seal off a channel 68 between the floor boards 56. The secondary cable 26 may extend within the channel 68 of the seat track cover 52. The seat track 60 may define a channel 72 that receives the two retention legs 62 of the seat track cover 52. Those of ordinary skill in the art will readily appreciate that securing the secondary cable 26 within the channel 64 of the seat track cover 52 may eliminate the need to provide a raceway for housing the secondary cable 26. It is to be appreciated that FIG. 3 is merely one approach for routing the secondary cable 26 between the passenger seats 22, and that other approaches which may include a raceway (not illustrated) may also be used as well.

FIG. 4 is a perspective view of one of the reels 30 shown in FIG. 2. Referring to both FIGS. 2 and 4, the reel 30 may be able to rotate about the axis of rotation A-A (FIG. 4) in both the clockwise and counterclockwise direction in order to adjust the variable length V of the secondary cable 26. A connector 44 may be located at the axis of rotation A-A of the reel 30, and may connect to or be part of a slip ring 74 (shown in FIG. 5). Those of ordinary skill in the art will appreciate that the slip ring 74 allows for the transmission of electrical power and data from a stationary structure to a rotating structure. In the exemplary embodiment as shown, the connector 44 is a male connector, however it is to be appreciated that a female connector, or any other type of connector may be used as well.

Referring to FIG. 2, each passenger seat 22 may include a control module 46 for delivering electrical power and data to a specific row of passenger seats 22. The control module 46 may include electronic circuitry for transmitting power and may include an electronic circuit, a combinational logic circuit, a field programmable gate array (FPGA), a processor (shared, dedicated, or group) that executes code, or a combination of some or all of the above, such as in a system-on-a-chip. The control module 46 may include an input 36 for receiving electric power, data, or both from the electrical source 20 (FIG. 1) if the passenger seat 22 is located in the first row R1. Those of ordinary skill in the art will readily appreciate that although a first row R1 is referenced, the passenger cabin of an aircraft or other vehicle may be partitioned into multiple sections where each section includes a first row. Thus, a vehicle may have multiple first rows that are connected to the electrical source 20. It is to be appreciated that if the passenger seat 22 was not in a designated first row R1 and was instead located directly behind another passenger seat 22, then the input 36 would receive power and data from a passenger seat 22 located directly in front. Furthermore, it should also be appreciated that while the disclosure describes power and data being transmitted from front to back, power and data could also be transmitted from a back passenger seat to a front passenger seat as well. The control module 46 may also include an output 38 for transmitting electric power, data, or both to the secondary cable 26 wound around the corresponding reel 30.

In the non-limiting embodiment as shown in FIG. 2, a connector 78 may be located on an end portion 70 of the main cable 24. The connector 78 may be electrically coupled to the input 36 of the control module 46 associated with the passenger seat 22 in row R1 though a cable 80. Alternatively, in another embodiment the connector 78 may mate directly to the input 36. The control module 46 may be electrically coupled to the secondary cable 26 through the output 38. Specifically, referring to FIGS. 2, 4 and 5, one or more cables 84 may electrically couple the output 38 of the control module 46 with the connector 44 of the reel 30.

The connector 44 is electrically coupled to the secondary cable 26. Referring to FIG. 5, in one embodiment the reel 30 may include one or more spokes 86 that extend between the slip ring 74 and an outermost rim 90 of the reel 30. In the embodiment as shown, the secondary cable 26 may be split into three different sections of cables 92, where each section of cable 92 is routed through a channel 96 located within one of the spokes 86. However, it is to be appreciated that this illustration is merely exemplary in nature, and any number of spokes may be used. Furthermore, the entire secondary cable 26 may also be routed through a single spoke 86 as well.

FIG. 6 is a side view of the reel 30. Referring to both FIGS. 5 and 6, the sections of cables 92 may each exit an opening 94 of the spoke 86, and may be wrapped or wound around an outer surface 98 of the rim 90 of the reel 30. In the exemplary embodiment as shown in FIGS. 4-6, a plurality of teeth 100 may be defined by an outermost surface 102 of the rim 90 of the reel 30. The teeth 100 may be shaped to meshingly engage with a spiral thread of a worm drive shaft (not illustrated in the figures). Those of ordinary skill in the art will readily appreciate that the meshing engagement between the teeth 100 of the reel 30 and the spiral threads of the worm drive shaft substantially prevents rotation of the reel 30. In other words, the reel 30 is unable to rotate and thereby adjust the variable length V of the secondary cable 26 (FIG. 2) unless the worm drive shaft is rotated about its axis of rotation. It is to be appreciated that while a worm drive shaft is described, other approaches for preventing rotation of the reel 30 may be used as well such as, for example, a ratchet and pawl or a screw set.

Turning back to FIG. 2, the secondary cable 26 may terminate at an end portion 104. As seen in FIG. 2, a connector 108 may be located at the end portion 104 of the secondary cable 26. The end portion 104 of the secondary cable 26 may extend from the seat track cover 52, and connects to the input 36 of the control module 46 of the passenger seat 22 located in row R2 through the cable 80.

Referring generally to the figures, the disclosed electrical distribution system provides a modular, adjustable approach for distributing electrical power and data throughout an aircraft. Specifically, the length of the secondary cables may be adjusted by rotating a corresponding reel, which allows further flexibility in the event the position of the passenger seats is modified. In contrast, new or modified raceways usually need to be provided in existing systems in the event the positioning between passenger seats changes. The disclosed distribution system may also result in reduced installation and engineering time associated with design and enhanced ergonomics associated with installation. Finally, because the disclosed adjustable distribution system may eliminate raceways, the resulting surface along the floor boards of the aircraft is relatively flat.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A system for electrically coupling a first structure with a second structure in a vehicle, the system comprising:
   a control module receiving at least one of electrical power and data;
   a cable having a variable length and electrically coupled to the control module, wherein the cable transmits the at least one of electrical power and data from the first structure to the second structure, the cable including a plurality of cable sections;
   a reel located at the first structure and defining an axis of rotation, wherein cable is windable around the reel and the reel is rotatable about the axis of rotation to adjust the variable length of the cable, and wherein the variable length of the cable is a portion of the cable that extends between the first structure and the second structure and is the portion of the cable that is not wound around the reel; and
   the reel including a plurality of spokes, and each cable section of the plurality of cable sections is routed through one spoke of the plurality of spokes.

2. The system of claim 1, further comprising an electrical source that is a main source of the at least one of electrical power and data within the vehicle, wherein the control module receives the at least one of electrical power and data from the electrical source.

3. The system of claim 1, wherein the control module receives the at least one of electrical power and data from a structure that is located directly in front of the first structure.

4. The system of claim 3, wherein the structure that is located directly in front of the first structure is a row of passenger seats.

5. The system of claim 1, wherein the control module includes an input and an output, and wherein the input receives the at least one of electrical power and data and the output transmits the at least one of electrical power and data to the cable.

6. The system of claim 5, further comprising a connector located at the axis of rotation of the reel, wherein the connector electrically couples the output of the control module to the cable.

7. The system of claim 1, wherein the first structure and the second structure are each a row of passenger seats.

8. The system of claim 1, wherein the reel defines a rim, wherein a plurality of teeth are defined by an outermost surface of the rim of the reel, with the plurality of teeth shaped to meshingly engage with a spiral thread of a worm drive shaft.

9. The system of claim 1, wherein the first structure is spaced at a pitch distance away from the second structure within the vehicle.

10. The system of claim 9, wherein the cable includes a fixed length that is greater than the pitch distance.

11. The system of claim 1, wherein the reel is positioned substantially perpendicular with respect to a bottom surface of the first structure.

12. A system for electrically coupling a first row of passenger seats with a second row of passenger seats in an aircraft, the system comprising:

a control module receiving at least one of electrical power and data;

a cable having a variable length and electrically coupled to the control module, wherein the cable transmits the at least one of electrical power and data from the first row of passenger seats to the second row of passenger seats, the cable including a plurality of cable sections;

a reel located at the first row of passenger seats and defining an axis of rotation, wherein the cable is windable around the reel and the reel is rotatable about the axis of rotation to adjust the variable length of the cable, wherein the variable length of the cable is a portion of the cable that extends between the first row of passenger seats and the second row of passenger seats and is the portion of the cable that is not wound around the reel; and the reel including a plurality of spokes and each cable section of the plurality of cable sections is routed through one spoke of the plurality of spokes.

13. The system of claim 12, further comprising an electrical source that is a main source of the at least one of electrical power and data within the aircraft, wherein the control module receives the at least one of electrical power and data from the electrical source.

14. The system of claim 12, wherein the control module receives the at least one of electrical power and data from a row of passenger seats located directly in front of the first row of passenger seats.

15. The system of claim 12, wherein the control module includes an input and an output, and wherein the input receives the at least one of electrical power and data and the output transmits the at least one of electrical power and data to the cable.

16. The system of claim 15, further comprising a connector located at the axis of rotation of the reel, wherein the connector electrically couples the output of the control module to the cable.

17. The system of claim 12, wherein the reel defines a rim and a plurality of teeth defined by an outermost surface of the rim of the reel, and wherein the plurality of teeth are shaped to meshingly engage with a spiral thread of a worm drive shaft.

18. A method of electrically coupling a first row of passenger seats with a second row of passenger seats in an aircraft, the method comprising:

electrically coupling a cable to a control module, wherein the cable has a variable length and the control module receives at least one of electrical power and data, the cable including a plurality of cable sections, and wherein the cable transmits the at least one of electrical power and data from the first row of passenger seats to the second row of passenger seats;

winding the cable around a reel, wherein the reel is located at the first row of passenger seats and defines an axis of rotation, the reel including a plurality of spokes;

routing each cable section of the plurality of cable sections through one spoke of the plurality of spokes; and rotating the reel about the axis of rotation to adjust the variable length of the cable, wherein the variable length of the cable is a portion of the cable that extends between the first row of passenger seats and the second row of passenger seats and is the portion of the cable that is not wound around the reel.

19. The method of claim 18, further comprising electrically coupling the control module to an electrical source, wherein the electrical source is a main source of the at least one of electrical power and data within the aircraft.

20. The method of claim 18, further comprising electrically coupling the control module to a row of passenger seats located directly in front of the first row of passenger seats.

* * * * *